(12) United States Patent
Nishikawa

(10) Patent No.: US 9,031,159 B2
(45) Date of Patent: May 12, 2015

(54) COMMUNICATION DEVICE AND COMMUNICATION METHOD

(71) Applicant: Icom Incorporated, Osaka (JP)

(72) Inventor: Nobuyoshi Nishikawa, Osaka (JP)

(73) Assignee: Icom Incorporated, Osaka (JP)

( * ) Notice: Subject to any disclaimer, the term of this patent is extended or adjusted under 35 U.S.C. 154(b) by 0 days.

(21) Appl. No.: 14/092,197

(22) Filed: Nov. 27, 2013

(65) Prior Publication Data

US 2014/0219371 A1    Aug. 7, 2014

(30) Foreign Application Priority Data

Feb. 6, 2013   (JP) ................................. 2013-021487

(51) Int. Cl.
*H04L 25/49*   (2006.01)
*H04L 27/26*   (2006.01)

(52) U.S. Cl.
CPC .................................. *H04L 27/2621* (2013.01)

(58) Field of Classification Search
CPC ............ H04L 27/2615; H04L 27/2614; H04L 27/2621; H04L 27/2634; H04L 1/0668; H04L 27/2628; H04L 27/265
USPC ................... 375/260, 297, 316; 370/208, 210
See application file for complete search history.

(56) References Cited

U.S. PATENT DOCUMENTS

2006/0078066 A1* 4/2006 Yun et al. ...................... 375/299
2014/0362934 A1* 12/2014 Kumar .......................... 375/260

FOREIGN PATENT DOCUMENTS

JP        2006-165781 A      6/2006

* cited by examiner

*Primary Examiner* — Tesfaldet Bocure
(74) *Attorney, Agent, or Firm* — Warner Norcross & Judd LLP

(57) ABSTRACT

A modulator generates modulation signals from input signals. A combiner arranges subcarrier modulation signals based on the modulation signals in order thereby to generate a compound matrix. The shifter shifts elements of each row of the compound matrix to generate shift matrix. An IFFT calculator subjects the shift matrix to inverse fast Fourier transformation to generate inverse transformation matrix. A maximum detector detects a column with a highest peak-to-average power ratio among columns of the inverse transformation matrix. A minimum detector detects an inverse transformation matrix including a column with a lowest peak-to-average power ratio among columns of inverse transformation matrices detected by the maximum detector. A transmitter generates a transmission signal based on baseband signals generated from each column of the inverse transformation matrix detected by the minimum detector, and transmits the transmission signal.

19 Claims, 11 Drawing Sheets

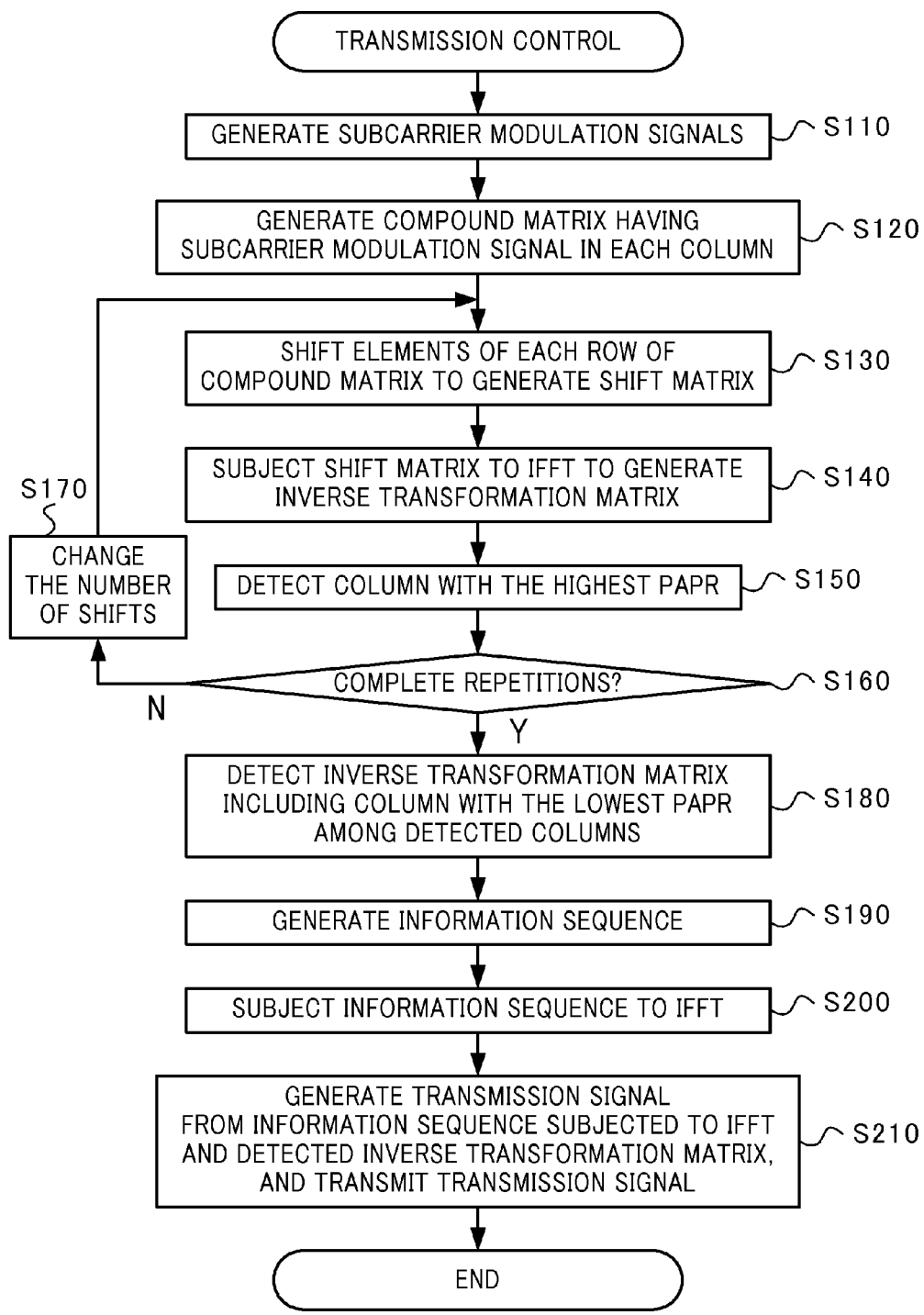

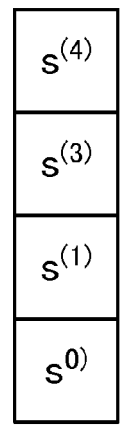
FIG. 6A
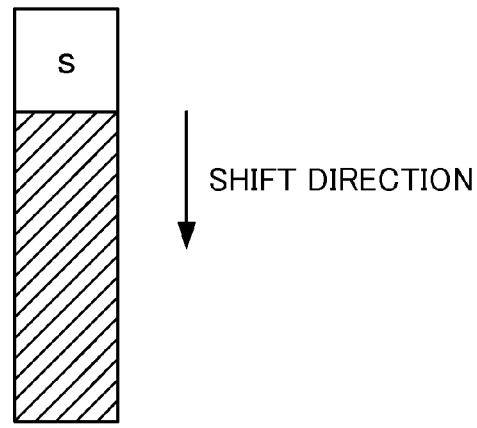
FIG. 6B
FIG. 7
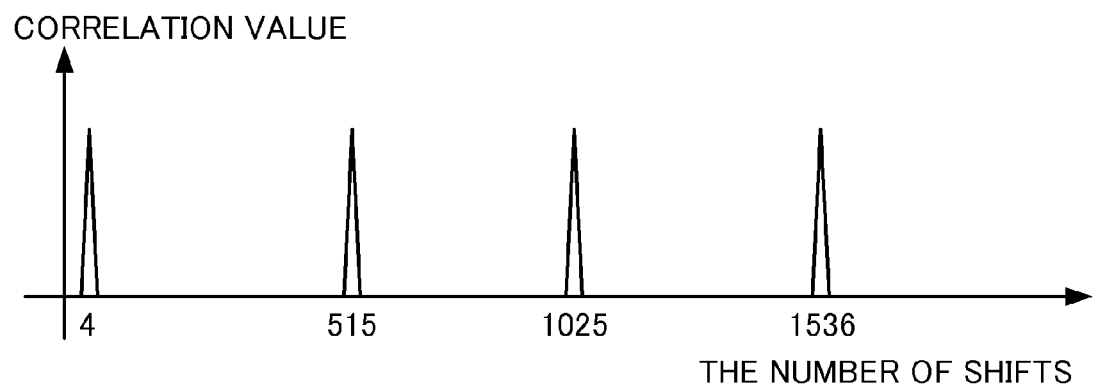

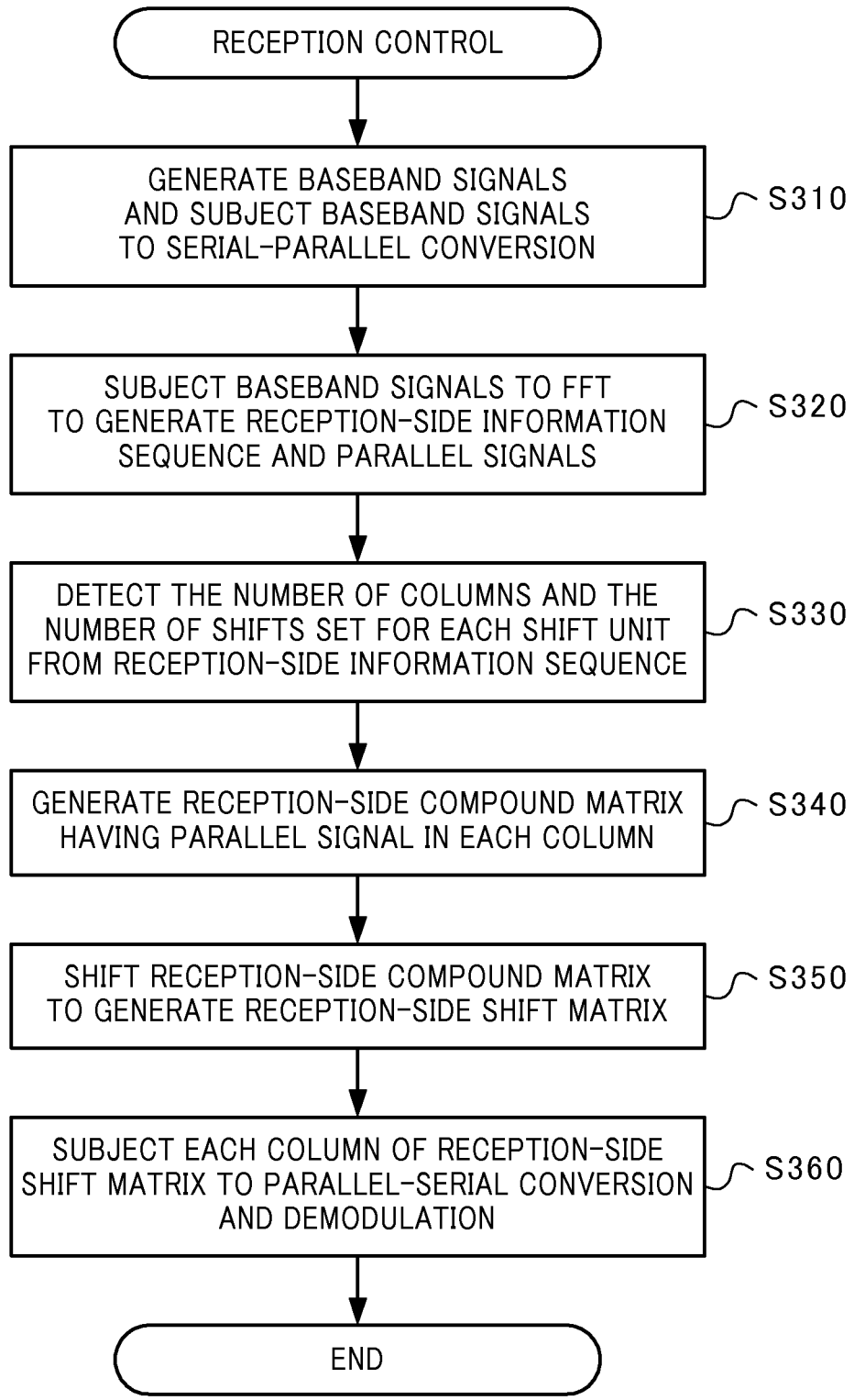

COMMUNICATION DEVICE AND COMMUNICATION METHOD

CROSS-REFERENCE TO RELATED APPLICATION

This application claims the benefit of Japanese Patent Application No. 2013-021487, filed Feb. 6, 2013, the entire disclosure of which is incorporated by reference herein.

FIELD

This application relates to a communication device and a communication method.

BACKGROUND

In OFDM (Orthogonal Frequency-Division Multiplexing) communication, input signals are subjected to subcarrier modulation, and the modulated signals are subjected to IFFT (Inverse Fast Fourier Transformation), thereby generating baseband signals. Therefore, if the size of FFT (Fast Fourier Transformation) increases due to the increased number of subcarriers, baseband signals with high peaks are generated, making PAPR (Peak-to-Average Power Ratio) high. The high PAPR requires an amplifier having linearity over a broad range in order to transmit signals without distortion. Therefore, arts to reduce PAPR have been developed.

In an orthogonal frequency division multiplexing communication device disclosed in Unexamined Japanese Patent Application Kokai Publication No. 2006-165781, in order to reduce PAPR, before performing IFFT, the phase of a subcarrier modulation signal is controlled on the basis of an optimal phase calculated by a sequential decision procedure.

The OFDM communication has a problem regarding reducing PAPR. In the orthogonal frequency division multiplexing communication device disclosed in Unexamined Japanese Patent Application Kokai Publication No. 2006-165781, it is required to repeatedly perform calculation processing to find an optimal phase to reduce PAPR and to control a phase for each subcarrier.

SUMMARY

The present invention has been made in view of the above circumstances, and has an objective of reducing PAPR and controlling the degree of PAPR reduction in the OFDM communication.

In order to achieve the above objective, a communication device according to a first aspect of the present invention communicates with another device in orthogonal frequency-division multiplexing wireless communication, and comprises:

a modulator that modulates input signals by a predetermined modulation scheme to generate primary modulation signals and generates subcarrier modulation signals that are parallel signals based on the primary modulation signals;

a combiner that arranges the subcarrier modulation signals in order thereby to generate a compound matrix having each of the subcarrier modulation signals in each column thereof;

a shifter that shifts elements of each row of the compound matrix in a predetermined direction by a number of shifts of a shift unit to which the each row belongs, based on a number of shifts set for each shift unit of a plurality of shift units, the each shift unit comprising a same number of rows in the compound matrix thereby to generate a shift matrix;

a first IFFT calculator that subjects the shift matrix to inverse fast Fourier transformation to generate an inverse transformation matrix;

a maximum detector that calculates a peak-to-average power ratio of a baseband signal generated for each of columns of the inverse transformation matrix and detects a column with a highest peak-to-average power ratio among the columns of the inverse transformation matrix;

a repeater that repeats processing by the shifter, the first IFFT calculator and the maximum detector while changing the number of shifts of at least any one of the plurality of shift units;

a minimum detector that detects an inverse transformation matrix including a column with a lowest peak-to-average power ratio among columns detected by the maximum detector; and a transmitter that combines elements of each column of the inverse transformation matrix detected by the minimum detector to generate baseband signals and transmits a transmission signal based on the baseband signals.

Preferably, the communication device according to a first aspect of the present invention further comprises:

an information generator that generates an information sequence indicating a number of the subcarrier modulation signals included in the compound matrix and a number of shifts set for each shift unit of the shift matrix corresponding to the inverse transformation matrix detected by the minimum detector; and a second IFFT calculator that subjects the information sequence to inverse fast Fourier transformation, wherein the transmitter combines a result of arithmetic operation of the second IFFT calculator and elements of each column of the inverse transformation matrix detected by the minimum detector to generate the baseband signals and transmits a transmission signal based on the baseband signals.

Preferably, the information generator shifts a data sequence in a predetermined direction, using the data sequence having an autocorrelation characteristic that an autocorrelation value thereof relative to the same data sequence not subjected to data shift is greater than an autocorrelation value thereof relative to the data sequence subjected to any data shift, based on the number of the subcarrier modulation signals included in the compound matrix and the number of shifts set for each shift unit of the shift matrix corresponding to the inverse transformation matrix detected by the minimum detector to generate shift data sequences, and combines the shift data sequences to generate the information sequence that is a column vector.

Preferably, the combiner generates the compound matrix based on the subcarrier modulation signals fewer than or equal to the number of rows of the shift unit, and the data sequence having the autocorrelation characteristic is a set of a same number of pieces of data as the number of rows of the shift unit.

Preferably, the shifter fixes a number of shifts of one shift unit of the plurality of shift units to a predetermined value, and the information generator generates the shift data sequence based on numbers of shifts set for shift units except the one shift unit whose number of shifts was fixed to the predetermined value, of the shift matrix corresponding to the inverse transformation matrix detected by the minimum detector.

Preferably, the number of shifts set for each shift unit is less than a value found by dividing the number of rows of the each shift unit by 4.

Alternatively, the information generator may use a first data sequence and a second data sequence to generate the information sequence, the first data sequence having an autocorrelation characteristic that an autocorrelation value thereof relative to the same data sequence not subjected to data shift is greater than an autocorrelation value thereof relative to the data sequence subjected to any data shift, the second data sequence having no correlation with the first data sequence, in such a way that the first data sequence is shifted in a predetermined direction based on the number of the subcarrier modulation signals included in the compound matrix and the number of shifts set for each shift unit of the shift matrix corresponding to the inverse transformation matrix detected by the minimum detector to generate shift data sequences, the shift data sequences are combined to generate a first information sequence that is a column vector, the second data sequence is added just behind the first data sequence, the first and second data sequences are combined to generate a second information sequence that is a column vector, and the information sequence is generated in which either one of the first information sequence or the second information sequence is a real part and the other is an imaginary part.

Preferably, the combiner generates the compound matrix based on the subcarrier modulation signals fewer than or equal to the number of rows of the shift unit, the first data sequence is a set of a same number of pieces of real number data as the number of rows of the shift unit, and the second data sequence is a set of a same number of pieces of real number data as a value found by subtracting a number of elements of the first data sequence from a size of the inverse fast Fourier transformation.

Preferably, the shifter fixes a number of shifts of one shift unit of the plurality of shift units to a predetermined value, and the information generator generates the shift data sequence based on numbers of shifts set for shift units except the one shift unit whose number of shifts was fixed to the predetermined value, of the shift matrix corresponding to the inverse transformation matrix detected by the minimum detector.

Preferably, the number of shifts set for each shift unit is less than a value found by dividing the number of rows of the each shift unit by 4.

Alternatively, the information generator may modulate data indicating the number of the subcarrier modulation signals included in the compound matrix and the number of shifts set for each shift unit of the shift matrix corresponding to the inverse transformation matrix detected by the minimum detector by a predetermined modulation scheme thereby to generate the information sequence.

A communication device according to a second aspect of the present invention communicates with another device in orthogonal frequency-division multiplexing wireless communication, and comprises:

a receiver that receives a transmission signal and generates baseband signals;

an FFT calculator that subjects the baseband signals to serial-parallel conversion and fast Fourier transformation thereby to generate parallel signals;

an information detector that detects a number of columns of a reception-side compound matrix to be generated and a number of shifts set for each shift unit of a plurality of shift units;

a reception-side combiner that arranges a same number of parallel signals as the number of columns detected by the information detector in order thereby to generate the reception-side compound matrix having each of the parallel signals in each of the columns thereof;

a reception-side shifter that shifts elements of each row of the reception-side compound matrix in a predetermined direction by a number of shifts of a shift unit to which the each row belongs based on the number of shifts detected by the information detector thereby to generate a reception-side shift matrix; and a demodulator that demodulates elements of each column of the reception-side shift matrix by a predetermined modulation scheme.

Preferably, the FFT calculator subjects the baseband signal to serial-parallel conversion and fast Fourier transformation to further generate a reception-side information sequence, and the information detector detects the number of columns of the reception-side compound matrix and the number of shifts from the reception-side information sequence.

Preferably, the information detector uses a reception-side data sequence to repeatedly determine whether the reception-side information sequence has correlation with the reception-side data sequence shifted in a predetermined direction while changing the number of shifts, and detect the number of columns and the number of shifts from the reception-side information sequence based on a number of shifts when the reception-side information sequence has correlation with the reception-side data sequence, the reception-side data sequence being a column vector obtained by adding a second reception-side data sequence just behind a first reception-side data sequence and combining the first and second data sequences, the first reception-side data sequence having an autocorrelation characteristic that an autocorrelation value thereof relative to the same data sequence not subjected to data shift is greater than an autocorrelation value thereof relative to the data sequence subjected to any data shift, the second reception-side data sequence having no correlation with the first reception-side data sequence.

Preferably, the first reception-side data sequence is a set of a same number of pieces of data as the number of rows of the shift unit, and the second reception-side data sequence is a set of a same number of pieces of data as a value found by subtracting a number of elements of the first reception-side data sequence from a size of the fast Fourier transformation.

Alternatively, the information detector may shift one of real part data that is a real part and imaginary part data that is an imaginary part of the reception-side information sequence in a predetermined direction while changing the number of shifts, repeatedly determines whether the real part data and the imaginary part data have correlation with each other, and detects the number of columns and the number of shifts from the reception-side information sequence based on a number of shifts when the real part data and the imaginary part data have correlation with each other.

Alternatively, the information detector may demodulate the reception-side information sequence by a predetermined modulation scheme to detect the number of columns and the number of shifts from the reception-side information sequence.

A communication method according to a third aspect of the present invention is performed by a communication device that communicates with another device in orthogonal frequency-division multiplexing wireless communication, the communication method comprises:

a modulation step of modulating input signals by a predetermined modulation scheme to generate primary modulation signals and generating subcarrier modulation signals that are parallel signals based on the primary modulation signals;

a combining step of arranging the subcarrier modulation signals in order thereby to generate a compound matrix having each of the subcarrier modulation signals in each column thereof;

a shift step of shifting elements of each row of the compound matrix in a predetermined direction by a number of shifts of a shift unit to which the each row belongs based on a number of shifts set for each shift unit of a plurality of shift units, the each shift unit comprising a same number of rows in the compound matrix thereby to generate a shift matrix;

a first IFFT step of subjecting the shift matrix to inverse fast Fourier transformation to generate an inverse transformation matrix;

a maximum detection step of calculating a peak-to-average power ratio of a baseband signal generated for each of columns of the inverse transformation matrix and detecting a column with a highest peak-to-average power ratio among the columns of the inverse transformation matrix;

a repetition step of repeating processing by the shift step, first IFFT step and maximum detection step while changing the number of shifts of at least any one of the plurality of shift units;

a minimum detection step of detecting an inverse transformation matrix including a column with a lowest peak-to-average power ratio among columns detected by the maximum detection step; and a transmission step of combining elements of each column of the inverse transformation matrix detected by the minimum detection step to generate baseband signals and transmitting a transmission signal based on the baseband signals.

A communication method according to a fourth aspect of the present invention is performed by a communication device that communicates with another device in orthogonal frequency-division multiplexing wireless communication, the communication method comprises:

a reception step of receiving a transmission signal and generating baseband signals;

an FFT step of subjecting the baseband signals to serial-parallel conversion and fast Fourier transformation to generate parallel signals;

an information detection step of detecting a number of columns of a reception-side compound matrix to be generated and a number of shifts set for each shift unit of a plurality of shift units;

a reception-side combining step of arranging a same number of parallel signals as the number of columns detected by the information detection step in order thereby to generate the reception-side compound matrix having each of the parallel signals in each of the columns thereof;

a reception-side shift step of shifting elements of each row of the reception-side compound matrix in a predetermined direction by a number of shifts of a shift unit to which the each row belongs based on the number of shifts detected by the information detection step thereby to generate a reception-side shift matrix; and a demodulation step of demodulating elements of each column of the reception-side shift matrix by a predetermined modulation scheme.

The present invention can reduce PAPR and control the degree of reduction of PAPR in OFDM communication.

BRIEF DESCRIPTION OF THE DRAWINGS

A more complete understanding of this application can be obtained when the following detailed description is considered in conjunction with the following drawings, in which:

FIG. 5 is a flowchart illustrating one example of transmission control operation that is performed by the communication device according to the embodiment;

FIGS. 6A and 6B are diagrams illustrating an example of correlation analysis at reception side that is performed by the communication device according to the embodiment;

FIG. 7 is a diagram illustrating an example of a result of correlation analysis at reception side that is performed by the communication device according to the embodiment;

FIG. 9 is a flowchart illustrating one example of reception control operation that is performed by the communication device according to the embodiment;

DETAILED DESCRIPTION

Figure 1:
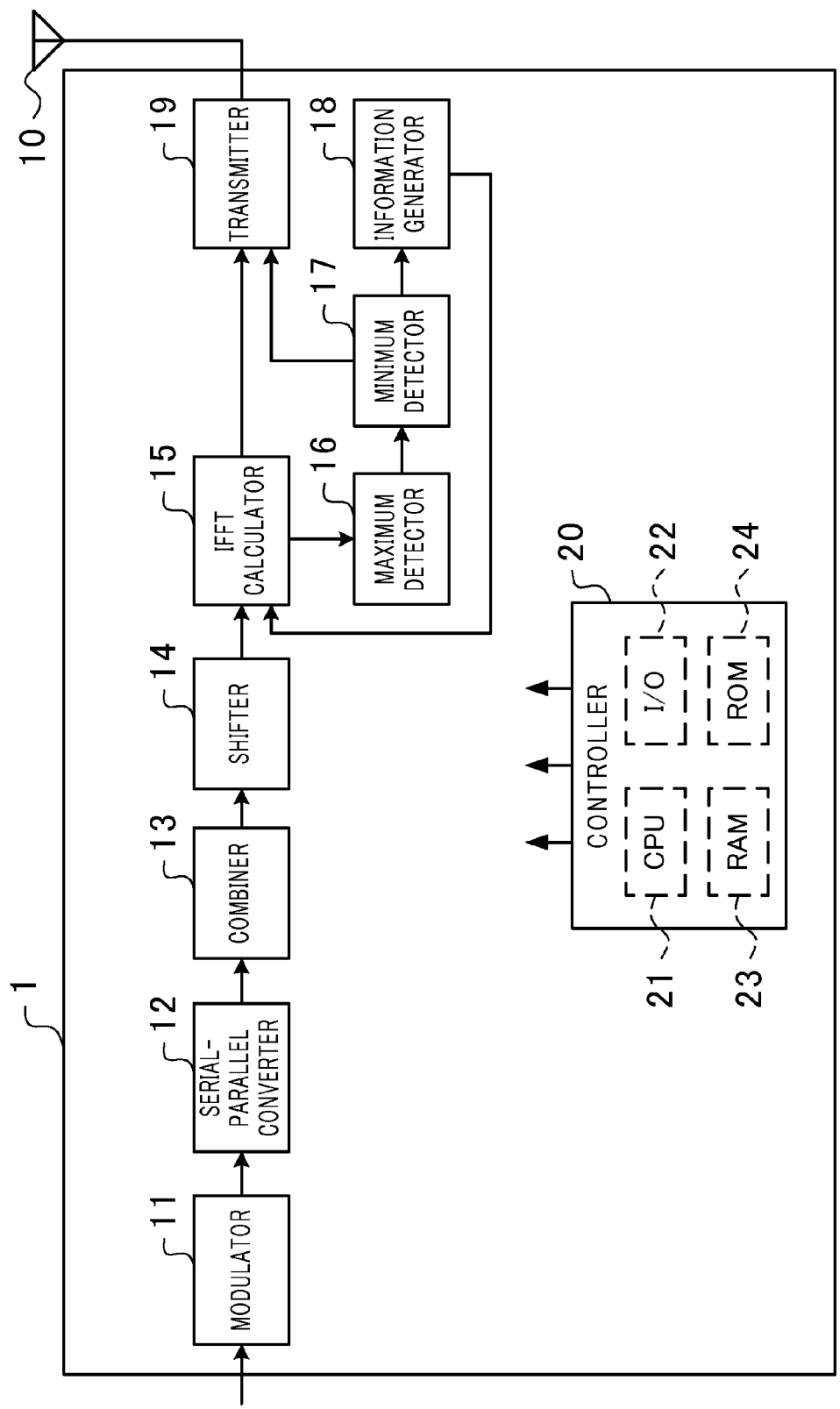
FIG. 1 is a block diagram illustrating an example of configuration of a communication device according to an embodiment of the present invention.

Hereinafter, an embodiment of the present invention will be described in detail with reference to drawings. In the drawings, identical or equivalent parts have the same reference numerals. In the following description, IFFT (Inverse Fast Fourier Transformation) includes not only IFFT but also IDFT (Inverse Discrete Fourier Transformation) as a concept. Accordingly, the embodiment of the present invention may be configured to use IDFT, instead of IFFT. Similarly, FFT (Fast Fourier Transformation) includes not only FFT but also DFT (Discrete Fourier Transformation) as a concept. If IDFT and DFT are performed, the size of FFT in the following description means the size of DFT.

FIG. 1 is a block diagram illustrating an example of configuration of a communication device according to an embodiment of the invention. The communication device 1 communicates with another device in OFDM (Orthogonal Frequency-Division Multiplexing) wireless communication. The communication device 1 includes an antenna 10, a modulator 11, a serial-parallel converter 12, a combiner 13, a shifter 14, an IFFT calculator 15, a maximum detector 16, a minimum detector 17, an information generator 18, a transmitter 19 and a controller 20.

The controller 20 includes a CPU (Central Processing Unit) 21, a RAM (Random Access Memory) 23, and a ROM (Read-Only Memory) 24. For less complexity and easier understanding, signal lines from the controller 20 to the respective parts are not illustrated in the FIGS. Actually, the controller 20 connects to the respective parts of the communication device 1 via input/output (I/O) 22, starts and terminates processing of the parts and controls contents to be processed.

The RAM 23 stores data for generating, for example, a transmission frame. The ROM 24 stores a control program to be used for the controller 20 to control operation of the communication device 1. The controller 20 controls the communication device 1 on the basis of the control program.

Figure 2:
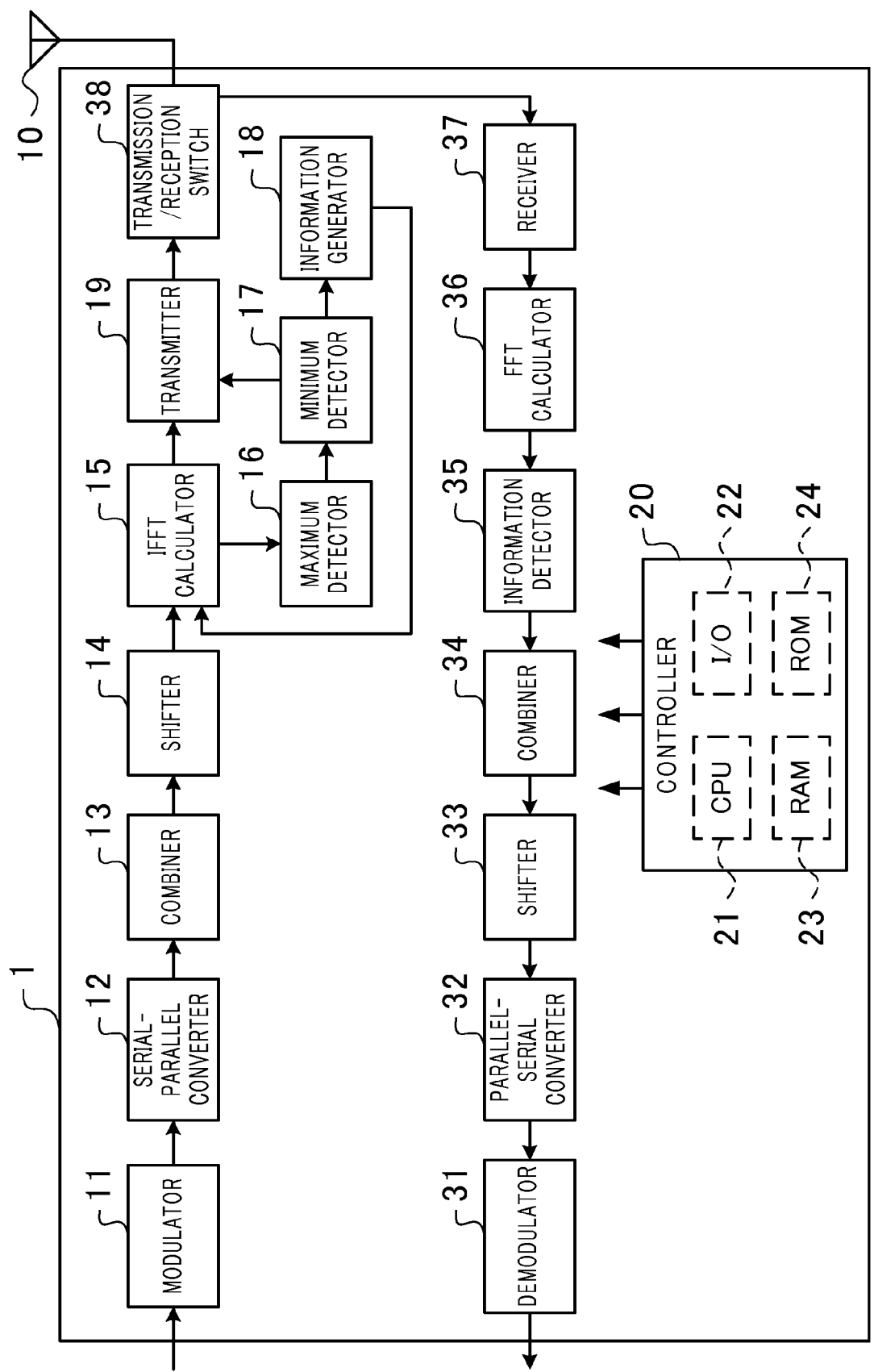
FIG. 2 is a block diagram illustrating a different example of configuration of the communication device according to the embodiment.

FIG. 2 is a block diagram illustrating a different example of configuration of the communication device according to the embodiment. In order to add a receiving function to the above communication device 1, a communication device 1 illustrated in FIG. 2 further includes a demodulator 31, a parallel-serial converter 32, a shifter 33, a combiner 34, an information detector 35, an FFT calculator 36, a receiver 37 and a transmission/reception switch 38. With reference to the communication device 1 having transmission and reception functions illustrated in FIG. 2, a communication method that is performed by the communication device 1 will be described below.

The modulator 11 modulates input signals by a predetermined modulation scheme to generate primary modulation signals, and sends the generated primary modulation signals to the serial-parallel converter 12. The predetermined modulation scheme is, for example, QPSK (Quadrature Phase-Shift Keying). The serial-parallel converter 12 subjects the primary modulation signals to serial-parallel conversion to generate subcarrier modulation signals that are parallel signals, and sends the generated subcarrier modulation signals to the combiner 13. The combiner 13 arranges the subcarrier modulation signals generated in the serial-parallel converter 12 in order thereby to generate a compound matrix having each of the subcarrier modulation signals in each column thereof, and sends the generated compound matrix to the shifter 14. When the size of FFT is N, the m-th subcarrier modulation signal d[m] is represented by the following equation (1). In the equation, suffix T indicates that the matrix is transposed. The same applies to the following description.

[Eq. 1]

$$d[m]=[d_1[m]d_2[m]\ldots d_N[m]]^T \qquad (1)$$

The shifter 14 shifts elements of each row of the compound matrix in a predetermined direction by a number of shifts of a shift unit to which the each row belongs based on a number of shifts set for each of a plurality of shift units, the each shift unit comprising a same number of rows in the compound matrix, thereby generating a shift matrix. The shift unit is a unit composed of elements in the compound matrix that are divided every predetermined number of rows. The shift indicates a cyclic shift. The shifter 14 sends the generated shift matrix to the IFFT calculator 15. For example, when the number of shift units is i, each of the i pieces of shift units corresponds to a submatrix with (N/i) rows and M columns in a compound matrix with N rows and M columns. If subcarrier modulation signals composing the compound matrix are shown divided every shift unit, the m-th subcarrier modulation signal d[m] is represented by equation (2) below. Column vectors for the respective shift units $d^{(1)}[m]$, $d^{(2)}[m]$ and $d^{(i)}[m]$ are represented respectively by equation (3) below. In equation (3), $n_1=N/i$, $n_2=2N/i$, $n_i=N$. If the subsequent IFFT calculator 15 performs IFFT, i is powers of 2. If IDFT is performed, i has only to be any divisor of the size of IDFT.

[Eq. 2]

$$d[m]=[d^{(1)}[m]d^{(2)}[m]\ldots d^{(i)}[m]]^T \qquad (2)$$

[Eq. 3]

$$d^{(1)}[m]=[d_1[m]d_2[m]\ldots d_{n_1}[m]]$$

$$d^{(2)}[m]=[d_{n_1+1}[m]d_{n_1+2}[m]\ldots d_{n_2}[m]]$$

$$d^{(i)}[m]=[d_{n_{i-1}+1}[m]d_{n_{i-1}+2}[m]\ldots d_{n_i}[m]] \qquad (3)$$

When the number of subcarrier modulation signals included in the compound matrix is M, the compound matrix is a matrix with N rows and M columns, as represented by equation (4) below. For example, a shift matrix $D^{(h)}$, which is generated in such a way that elements of each row of the compound matrix D is shifted leftwards by the number of shifts of a shift unit the each row belongs to, is represented by equation (5) below. In equation (5), the number of shifts of the first shift unit is k1, the number of shifts of the second shift unit is k2, and the number of shifts of the i-th shift unit is ki. Each numeral in square brackets indicates a remainder found in such a way that number indicating a subcarrier modulation signal (column number in the compound matrix) is added to the number of shifts, and the resulting sum is divided by the number of subcarrier modulation signals, M. By representing in this way, it is possible that the number of shifts can be 0 or any natural number. h in parenthesis that is the suffix of the shift matrix $D^{(h)}$ indicates the combination of the numbers of shifts of shift units.

[Eq. 4]

$$D = \begin{bmatrix} d^{(1)}[1] & d^{(1)}[2] & \ldots & d^{(1)}[M] \\ d^{(2)}[1] & d^{(2)}[2] & \ldots & d^{(2)}[M] \\ \vdots & \vdots & \ddots & \vdots \\ d^{(i)}[1] & d^{(i)}[2] & \ldots & d^{(i)}[M] \end{bmatrix} \qquad (4)$$

[Eq. 5]

$$D^{(h)} = \begin{bmatrix} d^{(1)}[k_1+1(\text{mod}M)] & d^{(1)}[k_1+2(\text{mod}M)] & \ldots & d^{(1)}[k_1+M(\text{mod}M)] \\ d^{(2)}[k_2+1(\text{mod}M)] & d^{(2)}[k_2+2(\text{mod}M)] & \ldots & d^{(2)}[k_2+M(\text{mod}M)] \\ \vdots & \vdots & \ddots & \vdots \\ d^{(i)}[k_i+1(\text{mod}M)] & d^{(i)}[k_i+2(\text{mod}M)] & \ldots & d^{(i)}[k_i+M(\text{mod}M)] \end{bmatrix} \qquad (5)$$

The IFFT calculator 15 operates as a first IFFT calculator that subjects the shift matrix $D^{(h)}$ to IFFT to generate an inverse transformation matrix, as represented by equation (6) below. The IFFT calculator 15 sends the inverse transformation matrix to the maximum detector 16.

[Eq. 6]

$$G^{(h)} = F^{-1} \cdot D^{(h)} \quad (6)$$

The maximum detector 16 calculates the respective PAPRs (Peak-to-Average Power Ratio) of baseband signals, each baseband signal being generated for each of columns of the inverse transformation matrix, and detects a column with a highest PAPR among the columns included in the inverse transformation matrix. When each column vector in the inverse transformation matrix is represented by $G_m^{(h)}$ (1≤m≤M), the inverse transformation matrix is represented by equation (7) below. Then, PAPR of the column with the highest PAPR is represented by equation (8) below. PAPR ($G_m^{(h)}$) indicates PAPR of a column vector $G_m^{(h)}$. That is, the maximum detector 16 detects a column whose PAPR is Ph in the inverse transformation matrix.

[Eq. 7]

$$G^{(h)} = [G_1^{(h)} G_2^{(h)} \ldots G_M^{(h)}] \quad (7)$$

[Eq. 8]

$$P_h = \max(\text{PAPR}(G_m^{(h)})) \quad (8)$$

The shifter 14, IFFT calculator 15 and maximum detector 16 repeat the above processing by a predetermined number of times while the number of shifts of at least any one of the plurality of shift units in the compound matrix is changed. If the number of shifts of each of the shift units is 1 to M, the highest PAPR of PAPRs of columns included in the inverse transformation matrix becomes the same value. Therefore, the shifter 14 may fix the number of shifts of any one of the shift units to a predetermined value.

For example, if the shifter 14 fixes the number of shifts of the first shift unit to 0, the number of patterns of the shift matrix $D^{(h)}$ is $M^{i-1}$, as represented by equation (9). In equation (9), values at the right side are remainders found by dividing k1, k2, ..., ki by M respectively; $q_1$, $q_i$ are any natural numbers that are greater than 0 and less than M−1. A predetermined number of repetitions of the above processing by the shifter 14, IFFT calculator 15 and maximum detector 16 is any value less than or equal to $M^{i-1}$. The greater the number of repetitions of the above processing is, the more PAPR can be reduced. The controller 20 controls the shifter 14, IFFT calculator 15 and maximum detector 16 so as to repeat the above processing, and operates as a repeater.

[Eq. 9]

$$(k_1, k_2, \ldots, k_i) = (0, 0, \ldots, 0) \quad (9)$$
$$\vdots$$
$$(k_1, k_2, \ldots, k_i) = (0, q_1, \ldots, q_i)$$
$$\vdots$$
$$(k_1, k_2, \ldots, k_i) = (0, M-1, \ldots, M-1)$$

Figure 3A:
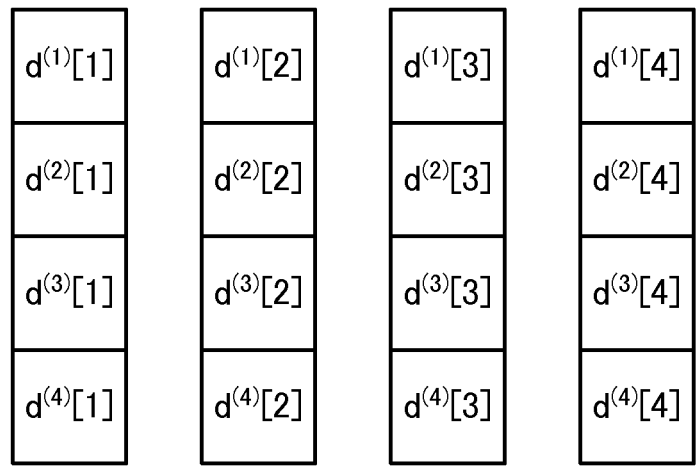
FIGS. 3A to 3C are diagrams illustrating examples of arithmetic processing at transmission side that is performed by the communication device according to the embodiment.
Figure 3B:
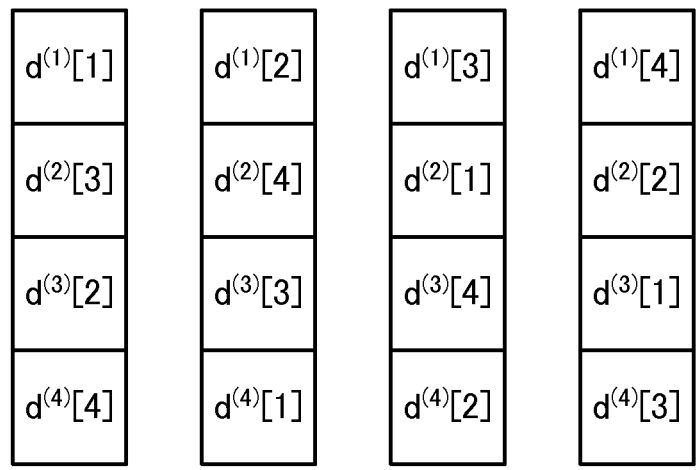
Figure 3C:
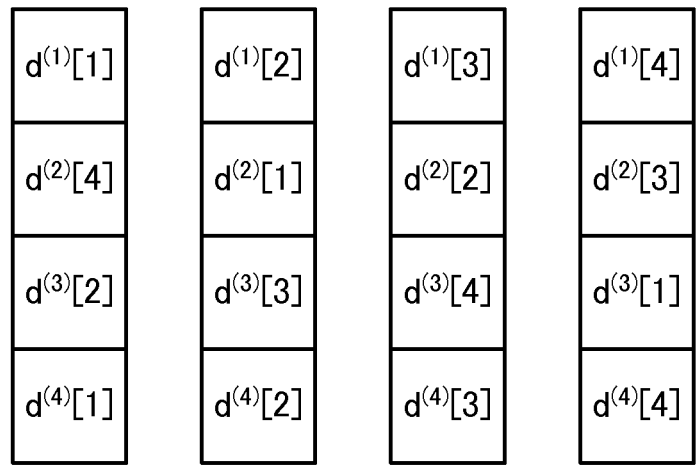

FIGS. 3A to 3C are diagrams illustrating examples of arithmetic processing at transmission side that is performed by the communication device according to the embodiment. The number of subcarrier modulation signals included in a compound matrix is fixed to 4, the number of shift units is fixed to 4, and the number of shifts of the first shift unit is fixed to 0. The shifter 14 shifts the compound matrix illustrated in FIG. 3A in such a way that each row included in the second shift unit is shifted leftwards by twice, each row included in the third shift unit is shifted leftward by once, and each row included in the fourth shift unit is shifted leftward by three times thereby to generate a shift matrix illustrated in FIG. 3B. Then, the IFFT calculator 15 and maximum detector 16 perform the above processing based on the shift matrix illustrated in FIG. 3B.

The shifter 14 also shifts the compound matrix illustrated in FIG. 3A in such a way that each row included in the second shift unit is shifted leftwards by three times, each row included in the third shift unit is shifted leftwards by once, and each row included in the fourth shift unit is shifted by 0 thereby to generate a shift matrix illustrated in FIG. 3C. Then, the IFFT calculator 15 and maximum detector 16 perform the above processing based on the shift matrix illustrated in FIG. 3C. While changing the number of shifts of at least any one of the shift units in this way, the shifter 14, IFFT calculator 15 and maximum detector 16 repeat the above processing by a predetermined number of times.

The minimum detector 17 detects an inverse transformation matrix that includes a column with a lowest PAPR among columns of inverse transformation matrices detected by the maximum detector 16 during repetition of the above processing. The minimum detector 17 sends the inverse transformation matrix including the column with the lowest PAPR to the transmitter 19 and information generator 18. The lowest Ph value, Q, among Phs that are PAPRs of the columns of inverse transformation matrices detected by the maximum detector 16 is represented by equation (10) below. That is, the minimum detector 17 detects an inverse transformation matrix including a column whose PAPR is Q.

[Eq. 10]

$$Q = \min(P_1, P_2, \ldots, P_h, P_{M^{i-1}}) \quad (10)$$

The information generator 18 generates an information sequence that indicates a number of subcarrier modulation signals included in the compound matrix and a number of shifts set for each shift unit of the shift matrix before IFFT corresponding to the inverse transformation matrix detected by the minimum detector 17. The information generator 18 sends the generated information sequence to the IFFT calculator 15. The number of columns of the inverse transformation matrix equals to the number of subcarrier modulation signals included in the compound matrix. The shift matrix, the number of shifts set for each shift unit of the shift matrix, and the inverse transformation matrix corresponding to the shift matrix are related to one another and stored in, for example, the RAM 23. The information generator 18 detects the number of shifts set for each shift unit of the shift matrix corresponding to the inverse transformation matrix detected by the minimum detector 17 based on the information stored in the RAM 23. The information generator 18 may be configured to detect the number of shifts set for each shift unit based on a result of subjecting the inverse transformation matrix detected by the minimum detector 17 to FFT and the compound matrix.

The information generator 18 uses any data sequence that is a set of a same number of pieces of data as the number of rows of each shift unit and has an autocorrelation characteristic that an autocorrelation value thereof relative to the same data sequence not subjected to data shift is greater than an autocorrelation value thereof relative to the data sequence subjected to any data shift. As a data sequence having an autocorrelation characteristic, for example, a PN (Pseudo-random Noise) sequence and a CAZAC (Constant Amplitude Zero Auto-Correlation) sequence can be used. A data sequence having an autocorrelation characteristic has a relatively low PAPR and is not susceptible to the effects of fading.

One example of operation of the information generator 18 will be described. The combiner 13 generates a compound matrix based on subcarrier modulation signals fewer than or equal to the number of rows of each shift unit. The shifter 14 fixes the number of shifts of the first shift unit to 0. The information generator 18 shifts a data sequence in a predetermined direction based on the number of subcarrier modulation signals included in the compound matrix and the number of shifts set for each shift unit, except the first shift unit whose number of shifts is fixed to 0 by the shifter 14, of the shift matrix corresponding to the inverse transformation matrix detected by the minimum detector 17 thereby to generate shift data sequences. The information generator 18 arranges elements of the shift data sequences in order and combines the elements thereby to generate an information sequence that is a column vector.

A case in which the information generator 18 uses a PN sequence s will be described as an example. The number of elements of the PN sequence s equals to the number of rows of each shift unit, N/i. Since the number of subcarrier modulation signals included in the compound matrix is M, the information generator 18 shifts the PN sequence s downwards by M times, for example, to generate a shift data sequence $s^{(M)}$. M in parenthesis of the suffix indicates the number of shifts. The information generator 18 shifts the PN sequence s, for each of (i−1) pieces of shift units, except the first shift unit whose number of shifts was fixed to 0 by the shifter 14 among the i pieces of shift units, downwards based on the number of shifts set for each shift unit represented by the above equation (5) thereby to generate (i−1) pieces of shift data sequences, that is, $s^{(k2(modM))}$, $s^{(k3(modM))}$, ..., $s^{(ki(modM))}$. Then, the information generator 18 arranges the i pieces of shift data sequences together in order and combines the i pieces of shift data sequences thereby to generate an information sequence T that is a column vector, as represented by equation (11) below. Since the number of elements of each of the shift data sequence is N/i, the information sequence T is a column vector having the number of elements, N.

[Eq. 11]

$$T = \begin{bmatrix} s^{(M)} \\ s^{(k_2 (\mod M))} \\ s^{(k_3 (\mod M))} \\ \vdots \\ s^{(k_i (\mod M))} \end{bmatrix} \quad (11)$$

The IFFT calculator 15 operates as a second IFFT calculator that subjects the information sequence to IFFT. The IFFT calculator 15 sends the information sequence subjected to IFFT to the transmitter 19.

The transmitter 19 combines the information sequence subjected to IFFT and elements of each column of the inverse transformation matrix detected by the minimum detector 17 to generate baseband signals. The transmitter 19 transmits a transmission signal based on the baseband signals to another device via the transmission/reception switch 38.

Figure 4:
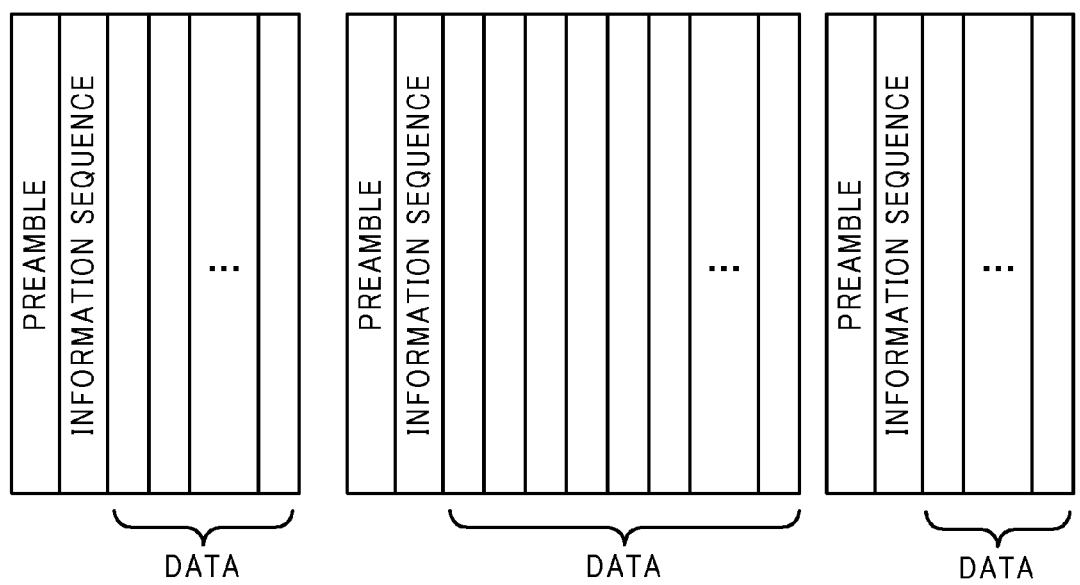
FIG. 4 is a diagram illustrating an example of a transmission frame that is sent by the communication device according to the embodiment.

FIG. 4 is a diagram illustrating an example of a transmission frame sent by the communication device according to the embodiment. A case in which an inverse transformation matrix generated by subjecting the shift matrix in FIG. 3C to IFFT is detected by the minimum detector 17 will be described as an example. The number of subcarrier modulation signals in the compound matrix is 4, the number of shifts of the second shift unit is 3, the number of shifts of the third shift unit is 1, and the number of shifts of the fourth shift unit is 0. Therefore, the information generator 18 generates the information sequence that is a column vector obtained by combining $s^{(4)}$, $s^{(3)}$, $s^{(1)}$, $s^{(0)}$. The transmitter 19 generates a transmission frame that includes a preamble of a time domain, the information sequence subjected to IFFT and a data portion that is a baseband signal obtained by combining the elements of each column of the inverse transformation matrix. A length of the data portion included in the transmission frame, that is, the number of subcarrier modulation signals included in the compound matrix may vary by transmission frame.

Or, data that are combinations of a preamble of a frequency domain, the information sequence before IFFT and the shift matrix corresponding to the inverse transformation matrix detected by the minimum detector 17 may be subjected to IFFT in the IFFT calculator 15 and the result of the IFFT may be configured to be sent to the transmitter 19.

FIG. 5 is a flowchart illustrating one example of transmission control operation performed by the communication device according to the embodiment. The modulator 11 modulates input signals by a predetermined modulation scheme to generate primary modulation signals, and the serial-parallel converter 12 subjects the primary modulation signals to serial-parallel conversion to generate a plurality of subcarrier modulation signals (Step S110). The combiner 13 arranges the plurality of subcarrier modulation signals in order thereby to generate a compound matrix D having each of the subcarrier modulation signals in each column thereof (Step S120). The shifter 14 shifts elements of each row of the compound matrix in a predetermined direction by the number of shifts of a shift unit to which the row belongs based on the number of shifts set for each of the plurality of shift units, each shift unit having the same number of rows in the compound matrix, thereby generating a shift matrix IP) (Step S130).

The IFFT calculator 15 subjects the shift matrix $D^{(h)}$ to IFFT to generate an inverse transformation matrix (Step S140). The maximum detector 16 calculates PAPRs of baseband signals, each baseband signal being generated for each of columns of the inverse transformation matrix, and detects a column with the highest PAPR among the columns of the inverse transformation matrix (Step S150). When the column with the highest PAPR is detected, the controller 20 determines whether repetitions have been completed (Step S160). If repetitions have not been performed by a predetermined number of times, the controller 20 determines that repetitions are not completed by a predetermined number of times (Step S160: N). If the controller 20 determines that repetitions are not completed, the controller 20 changes the number of shifts of at least any one of the shift units (Step S170), returns to Step S130 and repeats the above processing. On the other hand, if repetitions have been performed by a predetermined number of times, the controller 20 determines that repetitions are completed (Step S160: Y). If controller 20 determines that repetitions are completed, the minimum detector 17 detects an inverse transformation matrix including a column with the lowest PAPR among columns of inverse transformation matrices detected by the maximum detector 16 (Step S180).

The information generator 18 generates an information sequence that indicates the number of subcarrier modulation signals included in the compound matrix and the number of shifts set for each shift unit of a shift matrix corresponding to the inverse transformation matrix detected by the minimum detector 17 (Step S190). The IFFT calculator 15 subjects the information sequence to IFFT (Step S200). The transmitter 19 combines the information sequence subjected to IFFT and elements of the inverse transformation matrix detected by the minimum detector 17 for each column to generate baseband signals. The transmitter 19 generates a transmission signal from the baseband signals, and transmits the transmission signal to another device via the transmission/reception switch 38 (Step S210). Once transmission processing is completed at Step S210, transmission control processing is terminated.

Processing at reception side will be described below. The receiver 37 receives a transmission signal via the antenna 10 and transmission/reception switch 38, and generates baseband signals from the received transmission signal. The receiver 37 subjects the generated baseband signals to serial-parallel conversion, and sends the resulting baseband signals to the FFT calculator 36. The FFT calculator 36 subjects the resulting baseband signals to FFT. The FFT calculator 36 generates a reception-side information sequence from data located just behind a preamble among the data subjected to FFT, and generates parallel signals from data following the reception-side information sequence. The FFT calculator 36 sends the generated reception-side information sequence and parallel signals to the information detector 35. The information detector 35 detects a number of columns of a reception-side compound matrix to be generated and a number of shifts set for each shift unit of a predetermined plurality of shift units from the reception-side information sequence. The information detector 35 sends the detected number of columns and the detected number of shifts to the combiner 34.

One example of operation of the information detector 35 will be described. The information detector 35 provides a predetermined first reception-side data sequence that is a set of a same number of pieces of data as the number of rows of each shift unit and has an autocorrelation characteristic that an autocorrelation value thereof relative to the same data sequence not subjected to data shift is greater than an autocorrelation value thereof relative to the data sequence subjected to any data shift. The first reception-side data sequence is the same as the data sequence used by the information generator 18 at transmission side.

The information detector 35 provides a reception-side data sequence that is a column vector obtained by adding a second reception-side data sequence just behind the first reception-side data sequence and combining the first and second data sequences, the second reception-side data sequence being a set of a same number of pieces of data as a value found by subtracting a number of elements of the first reception-side data sequence from the size of FFT and having no correlation with the first reception-side data sequence. If the first reception-side data sequence is the PN sequence s used at transmission side and the second reception-side data sequence is A, then a reception-side data sequence U is represented by equation (12) below. As described above, the number of elements of the PN sequence s is N/i and the number of elements of the second data sequence A is a value found by subtracting N/i from the size of FFT. Therefore, the data sequence U at reception side is a column vector whose number of elements is N.

[Eq. 12]

$$U = \begin{bmatrix} s \\ A \end{bmatrix} \quad (12)$$

The information detector 35 repeatedly determines whether the reception-side information sequence has correlation with the reception-side data sequence U subjected to shift in a predetermined direction while changing the number of shifts. Then, the information detector 35 detects the number of columns of a reception-side compound matrix and the number of shifts set for each shift unit from the reception-side information sequence based on a number of shifts when the reception-side information sequence has correlation with the reception-side data sequence U. The information detector 35 can also detect the number of shift units from the number of pieces of peaks of correlation values between the reception-side information sequence and the data sequence U at reception side.

The combiner 34 arranges a same number of parallel signals as the number of columns detected by the information detector 35 in order thereby to generate a reception-side compound matrix having each of the parallel signals in each column thereof. The combiner 34 sends the generated reception-side compound matrix to the shifter 33. The shifter 33 shifts elements of each row of the reception-side compound matrix in a predetermined direction by a number of shifts of a shift unit to which the each row belongs based on the number of shifts set for each shift unit detected by the information detector 35, thereby generating a reception-side shift matrix. The shifter 33 sends the generated reception-side shift matrix to the parallel-serial converter 32. The communication device 1 at reception side preliminarily has information about the direction of shift performed by the shifter 14 at transmission side. The communication device 1 at reception side preliminarily has information about the position and the fixed number of shifts of the shift unit whose number of shifts was fixed by the shifter 14 at transmission side.

FIGS. 6A and 6B are diagrams illustrating an example of correlation analysis at reception side performed by the communication device according to the embodiment. A case in which a transmission signal is generated based on an inverse transformation matrix corresponding to the shift matrix illustrated in FIG. 3C will be described as an example. A reception-side information sequence is illustrated in FIG. 6A. The information detector 35 repeatedly shifts a reception-side data sequence U illustrated in FIG. 6B downwards, for example, by a predetermined number of times and performs correlation analysis thereof relative to the reception-side information sequence. FIG. 7 is a diagram illustrating an example of a result of correlation analysis at reception side performed by the communication device according to the embodiment. The horizontal axis indicates the number of shifts of a reception-side data sequence, and the vertical axis indicates a correlation value.

Peaks of the correlation value exist at points where the numbers of shifts are 4, 515, 1025 and 1536, respectively. Among the four peaks of the correlation value, the first peak indicates the number of column, and each of the rest of three peaks indicates the number of shifts set for each shift unit. The start points of the respective data sequences composing the reception-side information sequence are elements at 0th, the 512th, the 1024th and the 1536th, respectively. Differences between the numbers of shifts where the correlation value reaches its peaks and the start points of data sequences composing the reception-side information sequence show that the number of columns is 4, the number of shifts of the second shift unit is 3, the number of shifts of the third shift unit is 1, and the number of shifts of the fourth shift unit is 0. Information about that the number of shifts of the first shift unit was fixed to 0 is preliminarily kept at reception side.

When the communication device 1 at transmission side generates an information sequence, direction of shift of each data sequences is not limited to downwards, but may be upwards. In this case, the communication device 1 at reception side detects the number of columns and the number of shifts set for each shift unit based on the positions of peaks of the correlation value and elements at the rearmost of data sequences composing the reception-side information sequence.

Figure 8A:
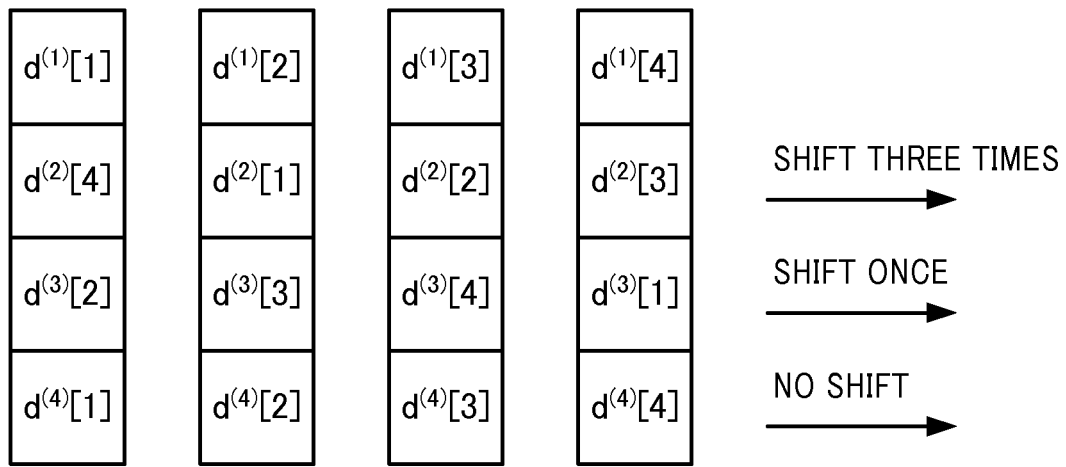
FIGS. 8A and 8B are diagrams illustrating an example of arithmetic processing at reception side that is performed by the communication device according to the embodiment.
Figure 8B:
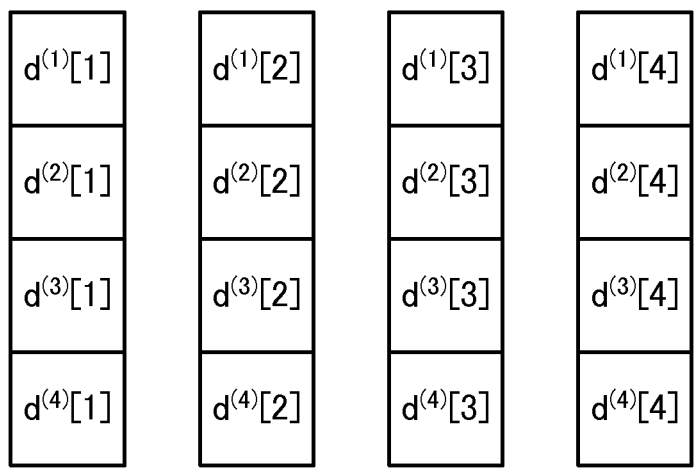

FIGS. 8A and 8B illustrate an example of arithmetic processing at reception side performed by the communication device according to the embodiment. FIG. 8A indicates a reception-side compound matrix. This reception-side compound matrix matches the shift matrix illustrated in FIG. 3C. The shifter 33 shifts the second shift unit rightwards by three times, the third shift unit rightwards by once and the fourth shift unit rightwards by 0 based on the number of shifts set for each shift unit detected by the information detector 35 thereby to generate a reception-side shift matrix illustrated in FIG. 8B. The reception-side shift matrix matches the compound matrix illustrated in FIG. 3A. The communication device 1 at reception side preliminarily has information about shift direction. Like the above example, shift may be performed in the opposite direction of the shift direction at transmission side by the same number of shifts as that at transmission side, or in the same direction as the shift direction at transmission side by a value found by subtracting the number of shifts set for each shift unit from the number of columns detected by the information detector 35.

As will be described later, the correlation value may reach its peak at a position other than a desired position depending on the number of shifts set for each shift unit performed at transmission side. Therefore, the number of shifts is preferably less than a value found by dividing the number of rows of each shift unit by 4.

The parallel-serial converter 32 subjects the respective columns of the reception-side shift matrix to parallel-serial conversion, and sends the resulting reception-side shift matrix to the demodulator 31. The demodulator 31 demodulates each column of the resulting reception-side shift matrix by a predetermined modulation scheme thereby to reproduce input signals.

FIG. 9 is a flowchart illustrating one example of reception control operation performed by the communication device according to the embodiment. The receiver 37 receives a transmission signal via the antenna 10 and transmission/reception switch 38. The receiver 37 generates baseband signals from the received transmission signal, and subjects the generated baseband signals to serial-parallel conversion (Step S310). The FFT calculator 36 subjects the resulting baseband signals to FFT to generate a reception-side information sequence and parallel signals (Step S320). The information detector 35 detects the number of columns and the number of shifts set for each shift unit of a predetermined plurality of shift units from the reception-side information sequence (Step S330).

The combiner 34 arranges the same number of parallel signals as the number of columns detected by the information detector 35 in order thereby to generate a reception-side compound matrix having each of the parallel signals as elements of each column thereof (Step S340). The shifter 33 shifts elements of each row of the reception-side compound matrix in a predetermined direction by the number of shifts of a shift unit to which the row belongs, based on the number of shifts set for each shift unit detected by the information detector 35 in the reception-side compound matrix, thereby generating a reception-side shift matrix (Step S350). The parallel-serial converter 32 subjects each column of the reception-side shift matrix to parallel-serial conversion, and the demodulator 31 demodulates elements of each column of the reception-side shift matrix subjected to parallel-serial conversion by a predetermined modulation scheme to reproduce input signals (Step S360). Once reproduction processing is completed at Step S360, receiving control processing is terminated.

A method to generate an information sequence is not limited to the above example. Hereinafter, an example of different operation of the information generator 18 will be described. Like the above example, the combiner 13 generates a compound matrix based on subcarrier modulation signals fewer than or equal to the number of rows of each shift unit, and the shifter 14 fixes the number of shifts of the first shift unit to 0. The information generator 18 provides any first data sequence that is a set of the same number of pieces of real number data as the number of rows of each shift unit and has an autocorrelation characteristic that an autocorrelation value thereof relative to the same data sequence not subjected to data shift is greater than an autocorrelation value thereof relative to the data sequence subjected to any data shift. The information generator 18 provides a second data sequence that is a set of the same number of pieces of real number data as a value found by subtracting a number of elements of the first data sequence from the size of FFT and does not have correlation with the first data sequence.

A case in which the information generator 18 uses a PN sequence s will be described as an example. The information generator 18 shifts a first data sequence in a predetermined direction based on the number of subcarrier modulation signals included in a compound matrix and the number of shifts set for each shift unit, except the first shift unit whose number of shifts was fixed to 0 by the shifter 14, of a shift matrix corresponding to the inverse transformation matrix detected by the minimum detector 17, thereby generate shift data sequences. The information generator 18 arranges elements of the shift data sequences in order as represented by the above equation (11), and combines the elements to generate a first information sequence that is a column vector. Then, the information generator 18 adds the second data sequence just behind the first data sequence and combines the first and second data sequences to generate a second information sequence that is a column vector. The information generator 18 sets either one of the first or second information sequences to be a real part and the other to be an imaginary part and combines the elements thereof to generate an information sequence. For example, the information generator 18 sets data represented by the above equation (11) to be a real part and data represented by the above equation (12) to be an imaginary part, and combines the elements thereof to generate an information sequence. Like the above example, the number of shifts set for each shift unit is preferably less than a value found by dividing the number of rows of each shift unit by 4.

Information detection processing at reception side will be described. The information detector 35 divides a reception-side information sequence into real part data that is a real part and imaginary part data that is an imaginary part, defines one of the real part data and the imaginary part data to be shifted in a predetermined direction, and then repeatedly determines whether the real part data and the imaginary part data have correlation with each other while changing the number of shifts of the defined one. For example, if elements of the imaginary part data are shifted, real part data of a reception-side information sequence corresponds to the data illustrated in FIG. 6A and imaginary part data corresponds to the data illustrated in FIG. 6B in the above example. Then, the information detector 35 determines whether the real part data has correlation with the imaginary part data subjected to shift in a predetermined direction. Since as a result of correlation analysis the correlation value have peaks as illustrated in FIG. 7, the number of columns and the number of shifts set for each shift unit can be detected. Transmission side and reception side do not need to share information about data sequences to be used to generate an information sequence, and the communication device 1 at reception side has only to have information which of real part data and imaginary part data to be shifted. The communication device 1 at transmission side can adopt any data sequence that is a set of real number data.

As another example of generating an information sequence, there is a method that does not use a data sequence having an autocorrelation characteristic. For example, the information generator 18 may modulate data that indicates the number of subcarrier modulation signals included in a compound matrix and the number of shifts set for each shift unit of the shift matrix corresponding to the inverse transformation matrix detected by the minimum detector 17 by a predetermined modulation scheme to generate an information sequence. In this case, the communication device 1 at reception side demodulates a reception-side information sequence by a predetermined modulation scheme to detect the number of columns and the number of shifts set for each shift unit. Any modulation scheme can be adopted as long as transmission side and reception side share information about the modulation scheme.

As described above, in the communication device 1 according to the embodiment of the present invention, operation is performed in which elements of a compound matrix including a plurality of subcarrier modulation signals are shifted by row, thereby reducing PAPR in the OFDM communication system. In addition, as will be described later, the degree of reduction of PAPR can be controlled.

Specific Examples

Next, effects of the present invention will be described using simulation. Simulation was performed in which a baseband signal was generated using a random signal as an input signal for the conventional art and the present invention and calculation of PAPR was repeated. The conventional art and the present invention were compared regarding CCDFs (Complementary Cumulative Distribution Function) of PAPRs, that is, PAPR characteristics in probability when QPSK was used as the modulation scheme and the size of FFT was set to be 2048. The conventional art is a method in which an input signal is modulated by a predetermined modulation scheme, a subcarrier modulation signal is generated from the modulated signal, and the subcarrier modulation signal is subjected to IFFT to generate a baseband signal without performing the above arithmetic processing.

Figure 10:
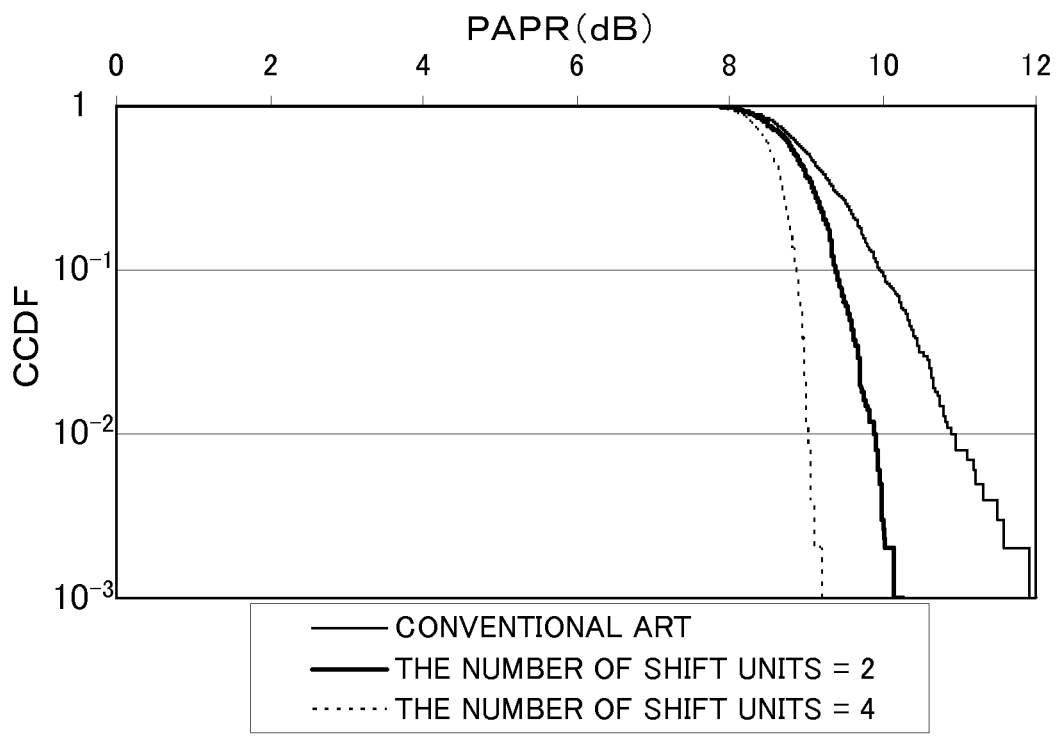
FIG. 10 is a graph illustrating CCDF characteristics of PAPR of a baseband signal in the communication device according to the embodiment.

FIG. 10 is a graph illustrating CCDF characteristics of PAPR of a baseband signal in the communication device according to the embodiment. The horizontal axis indicates PAPR (unit: dB), and the vertical axis indicates CCDF of PAPR. In the present invention, the number of subcarrier modulation signals included in a compound matrix was set to be 4. In the graph, CCDF characteristics of PAPR in the conventional art is represented by a thin solid line; CCDF characteristics of PAPR in the present invention is represented by a thick solid line when the number of shift units was 2 and CCDF characteristics of PAPR in the present invention is represented by a dashed line when the number of shift units was 4. The graph shows that the more the number of shift units increases, the more PAPR is reduced.

Figure 11:
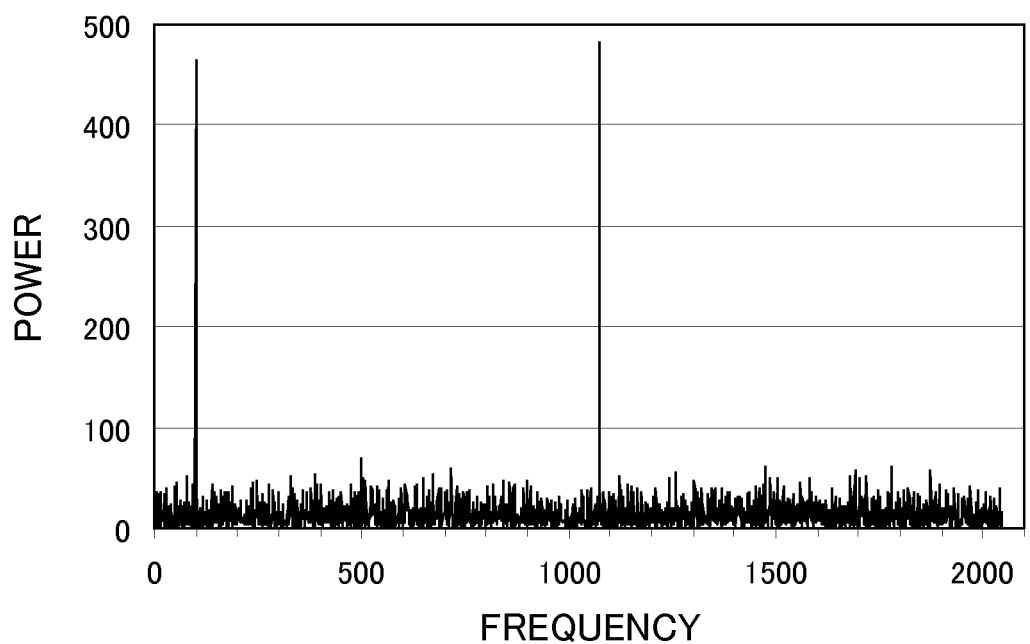
FIG. 11 is a graph illustrating an example of a result of correlation analysis at reception side that is performed by the communication device according to the embodiment.

FIG. 11 is a graph illustrating an example of a result of correlation analysis at reception side performed by the communication device according to the embodiment. Simulation was performed when the number of shift units was set to be 2, the number of subcarrier modulation signals included in a compound matrix was set to be 100 and the number of shifts of the second shift unit was set to be 50. In FIG. 11, the horizontal axis indicates a frequency (unit: subcarrier interval $f_0$), and the vertical axis indicates a power indicating the presence or absence of correlation. When frequencies are 100 and 1074, the correlation value peaks.

Figure 12:
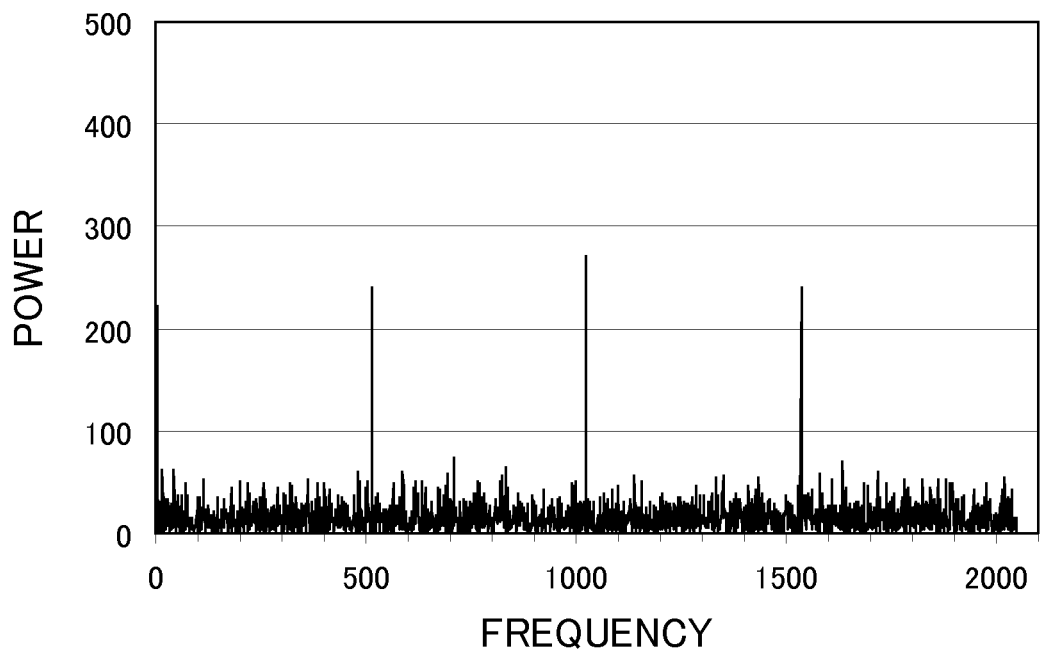
FIG. 12 is a graph illustrating an example of a result of correlation analysis at reception side that is performed by the communication device according to the embodiment.

FIG. 12 is a graph illustrating an example of a result of correlation analysis at reception side performed by the communication device according to the embodiment. The graph in FIG. 12 should be read in a similar manner as FIG. 11. The number of shift units was set to be 4, the number of subcarrier modulation signals included in a compound matrix was set to be 4, the number of shifts for the second shift unit was set to be 3, the number of shifts for the third shift unit was set to be 1, the number of shifts for the fourth shift unit was set to be 0, and then simulation was performed. FIG. 12 shows that when frequencies are 4, 515, 1025 and 1536, the correlation value peaks.

Figure 13:
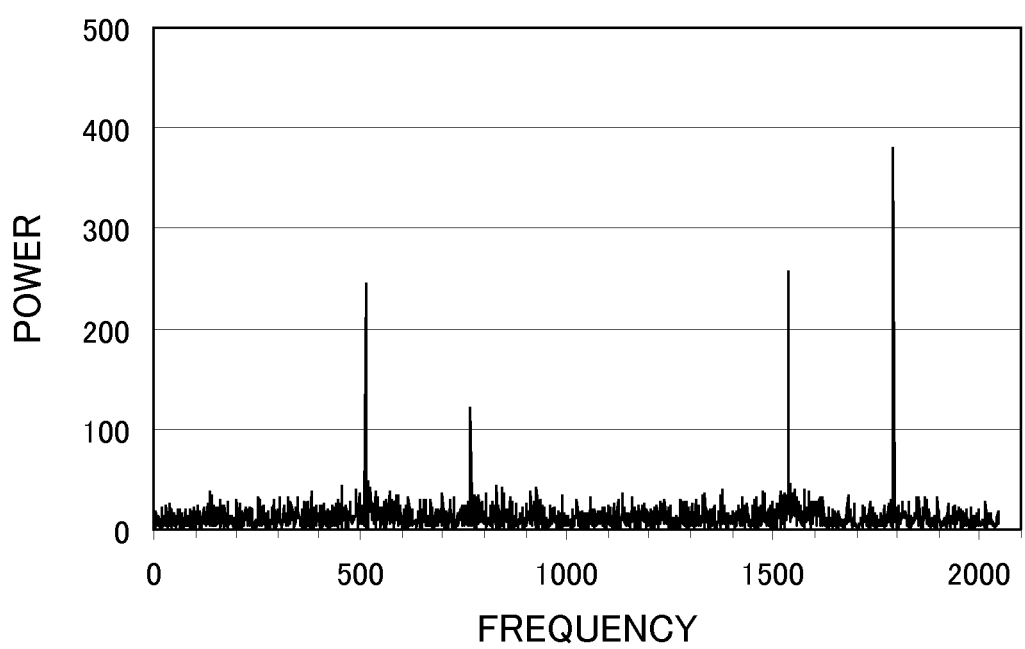
FIG. 13 is a graph illustrating an example of a result of correlation analysis at reception side that is performed by the communication device according to the embodiment.

FIG. 13 is a graph illustrating an example of a result of correlation analysis at reception side performed by the communication device according to the embodiment. The graph in FIG. 13 should be read in a similar manner as FIG. 11. The number of shift units was set to be 2, the number of subcarrier modulation signals included in a compound matrix was set to be 768, the number of shifts for the second shift unit was set to be 512 and then simulation was performed. FIG. 13 shows that when frequencies are 512, 768, 1536 and 1792, the correlation value peaks. Since the number of shift units is two, the desired number of peaks of the correlation value is two. Therefore, the graph shows that unnecessary peaks occur at the positions where frequencies are 512 and 1792. As a result of simulation, it has been found that the number of shifts set for each shift unit is preferably less than a value found by dividing the number of rows of each shift unit by 4 in order to prevent occurrence of such unnecessary peaks.

Figure 14:
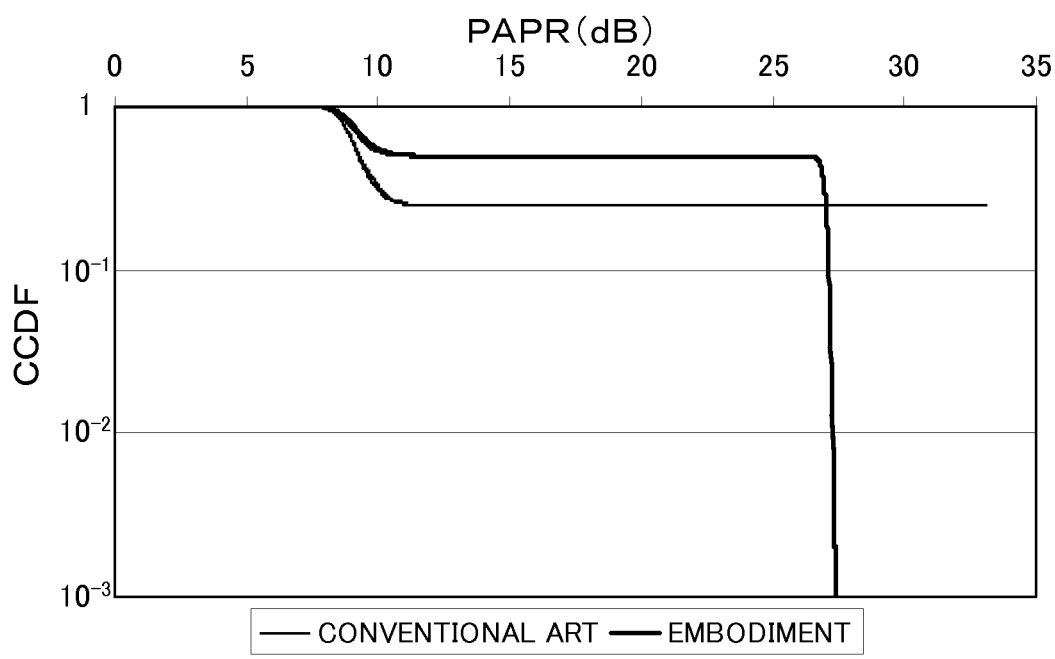
FIG. 14 is a graph illustrating CCDF characteristics of PAPR of a baseband signal in the communication device according to the embodiment.

FIG. 14 is a graph illustrating CCDF characteristics of PAPR of a baseband signal in the communication device according to the embodiment. The graph in FIG. 14 should be read in a similar manner as FIG. 10. Simulation was performed in such a way that the identical signal whose respective elements of a subcarrier modulation signal were in phase with each other, such as a signal having all 0, were used as an input signal, and then random signals were used as input signals. The number of shift units was set to be 2, the number of subcarrier modulation signals included in a compound matrix was set to be 4, the first subcarrier modulation signal included in the compound matrix was generated based on the identical signal, and the second to fourth subcarrier modulation signals were generated based on the random signals. The maximum PARR is 33.1 dB in the conventional art whereas the maximum PAPR is about 28 dB in the present invention, which shows that the maximum PAPR was reduced.

Figure 15:
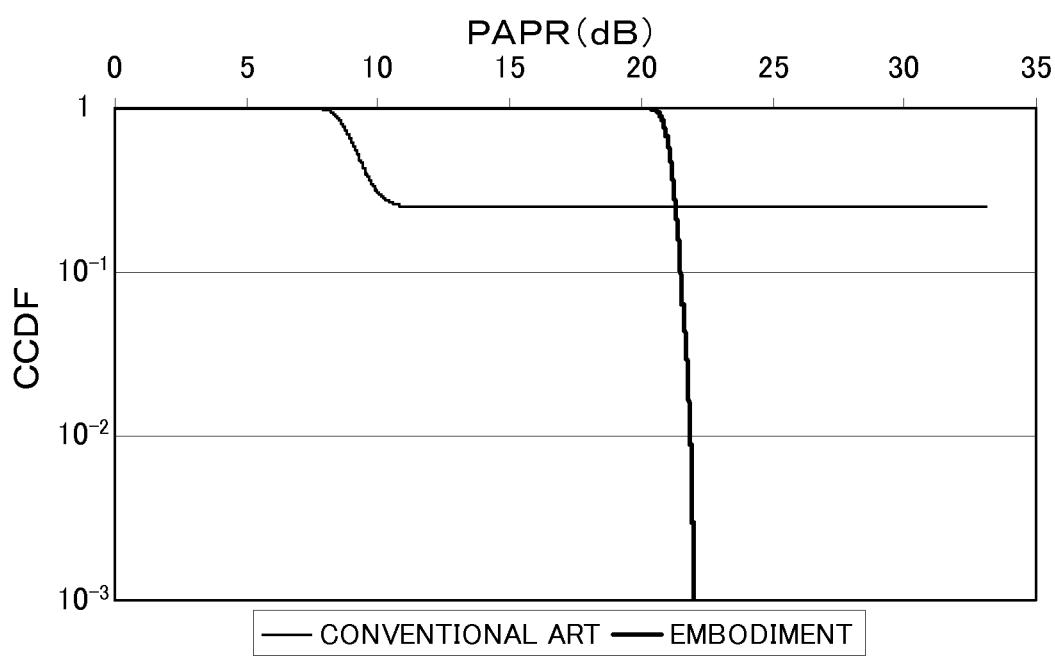
FIG. 15 is a graph illustrating CCDF characteristics of PAPR of a baseband signal in the communication device according to the embodiment.

FIG. 15 is a graph illustrating CCDF characteristics of PAPR of a baseband signal in the communication device according to the embodiment. The number of shift units was set to be 4 and the same simulation as FIG. 14 was performed. The maximum PAPR is 33.1 dB in the conventional art whereas the maximum PAPR is about 23 dB in the present invention, which shows that the maximum PAPR was reduced.

In the embodiment, shift of elements of each row of a compound matrix does not affect BER (Bit Error Rate).

The above simulation shows that in the present invention PAPR can be reduced by performing shift operation on elements of each row of a compound matrix including a plurality of subcarrier modulation signals, and the degree of reduction of PAPR can be controlled by changing the number of shift units.

An embodiment of the present invention is not limited to the above embodiment. A modulation scheme of the modulator 11 is not limited to QPSK, and PSK (Phase Shift Keying), QAM (Quadrature Amplitude Modulation) or the like other than QPSK can be also used. The order of the modulator 11 and serial-parallel converter 12 may be reversed so that the communication device 1 at transmission side subjects input signals to serial-parallel conversion, assigns the resulting signals to subcarrier signals and modulates each data of the parallel signals by a predetermined modulation scheme. In this case, in the communication device 1 at reception side, the order of the demodulator 31 and parallel-serial converter 32 is reversed and demodulation processing is performed. The IFFT calculator 15 may be configured to perform IDFT instead of IFFT. The FFT calculator 36 may be configured to perform DFT instead of FFT.

Having described and illustrated the principles of this application by reference to one preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A communication device that communicates with another device in orthogonal frequency-division multiplexing wireless communication, the communication device comprising:
    a modulator that modulates input signals by a predetermined modulation scheme to generate primary modulation signals and generates subcarrier modulation signals that are parallel signals based on the primary modulation signals;
    a transmission-side combiner that arranges the subcarrier modulation signals in order thereby to generate a compound matrix having each of the subcarrier modulation signals in each column thereof;
    a transmission-side shifter that shifts elements of each row of the compound matrix in a predetermined direction by a number of shifts of a transmission-side shift unit to which the each row belongs, based on a number of shifts set for each transmission-side shift unit of a plurality of transmission-side shift units, the each transmission-side shift unit comprising a same number of rows in the compound matrix thereby to generate a transmission-side shift matrix;
    a first IFFT calculator that subjects the transmission-side shift matrix to inverse fast Fourier transformation to generate an inverse transformation matrix;
    a maximum detector that calculates a peak-to-average power ratio of a baseband signal generated for each of columns of the inverse transformation matrix and detects a column with a highest peak-to-average power ratio among the columns of the inverse transformation matrix;
    a repeater that repeats processing by the transmission-side shifter, the first IFFT calculator and the maximum detector while changing the number of shifts of at least any one of the plurality of transmission-side shift units;
    a minimum detector that detects an inverse transformation matrix including a column with a lowest peak-to-average power ratio among columns detected by the maximum detector; and
    a transmitter that combines elements of each column of the inverse transformation matrix detected by the minimum detector to generate baseband signals and transmits a transmission signal based on the baseband signals.

2. The communication device according to claim 1 further comprising:
    an information generator that generates an information sequence indicating a number of the subcarrier modulation signals included in the compound matrix and a number of shifts set for each transmission-side shift unit of the transmission-side shift matrix corresponding to the inverse transformation matrix detected by the minimum detector; and
    a second IFFT calculator that subjects the information sequence to inverse fast Fourier transformation, wherein the transmitter combines a result of arithmetic operation of the second IFFT calculator and elements of each column of the inverse transformation matrix detected by the minimum detector to generate the baseband signals and transmits a transmission signal based on the baseband signals.

3. The communication device according to claim 2, the information generator shifts a data sequence in a predetermined direction, using the data sequence having an autocorrelation characteristic that an autocorrelation value thereof relative to the same data sequence not subjected to data shift is greater than an autocorrelation value thereof relative to the data sequence subjected to any data shift, based on the number of the subcarrier modulation signals included in the compound matrix and the number of shifts set for each transmission-side shift unit of the transmission-side shift matrix corresponding to the inverse transformation matrix detected by the minimum detector to generate shift data sequences, and combines the shift data sequences to generate the information sequence that is a column vector.

4. The communication device according to claim 3, wherein the combiner generates the compound matrix based on the subcarrier modulation signals fewer than or equal to the number of rows of the transmission-side shift unit, and the data sequence having the autocorrelation characteristic is a set of a same number of pieces of data as the number of rows of the transmission-side shift unit.

5. The communication device according to claim 3, wherein the transmission-side shifter fixes a number of shifts of one transmission-side shift unit of the plurality of transmission-side shift units to a predetermined value, and the information generator generates the shift data sequence based on numbers of shifts set for transmission-side shift units except the one transmission-side shift unit whose number of shifts was fixed to the predetermined value, of the transmission-side shift matrix corresponding to the inverse transformation matrix detected by the minimum detector.

6. The communication device according to claim 3, wherein the number of shifts set for each transmission-side shift unit is less than a value found by dividing the number of rows of the each shift unit by 4.

7. The communication device according to claim 2, wherein the information generator uses a first data sequence and a second data sequence to generate the information sequence, the first data sequence having an autocorrelation characteristic that an autocorrelation value thereof relative to the same data sequence not subjected to data shift is greater than an autocorrelation value thereof relative to the data sequence subjected to any data shift, the second data sequence having no correlation with the first data sequence, in such a way that the first data sequence is shifted in a predetermined direction based on the number of the subcarrier modulation signals included in the compound matrix and the number of shifts set for each transmission-side shift unit of the shift matrix corresponding to the inverse transformation matrix detected by the minimum detector to generate shift data sequences, the shift data sequences are combined to generate a first information sequence that is a column vector, the second data sequence is added just behind the first data sequence, the first and second data sequences are combined to generate a second information sequence that is a column vector, and the information sequence is generated in which either one of the first information sequence or the second information sequence is a real part and the other is an imaginary part.

8. The communication device according to claim 7, wherein the combiner generates the compound matrix based on the subcarrier modulation signals fewer than or equal to the number of rows of the transmission-side shift unit, the first data sequence is a set of a same number of pieces of real number data as the number of rows of the transmission-side shift unit, and the second data sequence is a set of a same number of pieces of real number data as a value found by subtracting a number of elements of the first data sequence from a size of the inverse fast Fourier transformation.

9. The communication device according to claim 7, wherein the shifter fixes a number of shifts of one transmission-side shift unit of the plurality of transmission-side shift units to a predetermined value, and the information generator generates the shift data sequence based on numbers of shifts set for shift units except the one transmission-side shift unit whose number of shifts was fixed to the predetermined value, of the transmission-side shift matrix corresponding to the inverse transformation matrix detected by the minimum detector.

10. The communication device according to claim 7, wherein the number of shifts set for each transmission-side shift unit is less than a value found by dividing the number of rows of the each transmission-side shift unit by 4.

11. The communication device according to claim 2, wherein the information generator modulates data indicating the number of the subcarrier modulation signals included in the compound matrix and the number of shifts set for each transmission-side shift unit of the transmission-side shift matrix corresponding to the inverse transformation matrix detected by the minimum detector by a predetermined modulation scheme thereby to generate the information sequence.

12. The communication device according to claim 1, further comprising:
a receiver that receives a transmission signal and generates baseband signals;
an FFT calculator that subjects the baseband signals to serial-parallel conversion and fast Fourier transformation thereby to generate parallel signals;
an information detector that detects a number of columns of a reception-side compound matrix to be generated and a number of shifts set for each reception-side shift unit of a plurality of reception-side shift units;
a reception-side combiner that arranges a same number of parallel signals as the number of columns detected by the information detector in order thereby to generate the reception-side compound matrix having each of the parallel signals in each of the columns thereof;
a reception-side shifter that shifts elements of each row of the reception-side compound matrix in a predetermined direction by a number of shifts of a reception-side shift unit to which the each row belongs based on the number of shifts detected by the information detector thereby to generate a reception-side shift matrix; and
a demodulator that demodulates elements of each column of the reception-side shift matrix by a predetermined modulation scheme.

13. The communication device according to claim 12, wherein the FFT calculator subjects the baseband signal to serial-parallel conversion and fast Fourier transformation to further generate a reception-side information sequence, and the information detector detects the number of columns of the reception-side compound matrix and the number of shifts from the reception-side information sequence.

14. The communication device according to claim 13, wherein the information detector uses a reception-side data sequence to repeatedly determine whether the reception-side information sequence has correlation with the reception-side data sequence shifted in a predetermined direction while changing the number of shifts, and detect the number of columns and the number of shifts from the reception-side information sequence based on a number of shifts when the reception-side information sequence has correlation with the reception-side data sequence, the reception-side data sequence being a column vector obtained by adding a second reception-side data sequence just behind a first reception-side data sequence and combining the first and second data sequences, the first reception-side data sequence having an autocorrelation characteristic that an autocorrelation value thereof relative to the same data sequence not subjected to data shift is greater than an autocorrelation value thereof relative to the data sequence subjected to any data shift, the second reception-side data sequence having no correlation with the first reception-side data sequence.

15. The communication device according to claim 14, wherein the first reception-side data sequence is a set of a same number of pieces of data as the number of rows of the reception-side shift unit, and the second reception-side data sequence is a set of a same number of pieces of data as a value found by subtracting a number of elements of the first reception-side data sequence from a size of the fast Fourier transformation.

16. The communication device according to claim 13, wherein the information detector shifts one of real part data that is a real part and imaginary part data that is an imaginary part of the reception-side information sequence in a predetermined direction while changing the number of shifts, repeatedly determines whether the real part data and the imaginary part data have correlation with each other, and detects the number of columns and the number of shifts from the reception-side information sequence based on a number of shifts when the real part data and the imaginary part data have correlation with each other.

17. The communication device according to claim 13, wherein the information detector demodulates the reception-side information sequence by a predetermined modulation scheme to detect the number of columns and the number of shifts from the reception-side information sequence.

18. A communication method performed by a communication device that communicates with another device in orthogonal frequency-division multiplexing wireless communication, the communication method comprising:
a modulation step of modulating input signals by a predetermined modulation scheme to generate primary modulation signals and generating subcarrier modulation signals that are parallel signals based on the primary modulation signals;

a combining step of arranging the subcarrier modulation signals in order thereby to generate a transmission-side shift compound matrix having each of the subcarrier modulation signals in each column thereof;

a transmission-side shift step of shifting elements of each row of the transmission-side compound matrix in a predetermined direction by a number of shifts of a transmission-side shift unit to which the each row belongs based on a number of shifts set for each transmission-side shift unit of a plurality of transmission-side shift units, the each transmission-side shift unit comprising a same number of rows in the transmission-side compound matrix thereby to generate a transmission-side shift matrix;

a first IFFT step of subjecting the transmission-side shift matrix to inverse fast Fourier transformation to generate an inverse transformation matrix;

a maximum detection step of calculating a peak-to-average power ratio of a baseband signal generated for each of columns of the inverse transformation matrix and detecting a column with a highest peak-to-average power ratio among the columns of the inverse transformation matrix;

a repetition step of repeating processing by the transmission-side shift step, first IFFT step and maximum detection step while changing the number of shifts of at least any one of the plurality of transmission-side shift units;

a minimum detection step of detecting an inverse transformation matrix including a column with a lowest peak-to-average power ratio among columns detected by the maximum detection step; and a transmission step of combining elements of each column of the inverse transformation matrix detected by the minimum detection step to generate baseband signals and transmitting a transmission signal based on the baseband signals.

19. The communication method according to claim 18, comprising:

a reception step of receiving a transmission signal and generating baseband signals;

an FFT step of subjecting the baseband signals to serial-parallel conversion and fast Fourier transformation to generate parallel signals;

an information detection step of detecting a number of columns of a reception-side compound matrix to be generated and a number of shifts set for each reception-side shift unit of a plurality of reception-side shift units;

a reception-side combining step of arranging a same number of parallel signals as the number of columns detected by the information detection step in order thereby to generate the reception-side compound matrix having each of the parallel signals in each of the columns thereof;

a reception-side shift step of shifting elements of each row of the reception-side compound matrix in a predetermined direction by a number of shifts of a reception-side shift unit to which the each row belongs based on the number of shifts detected by the information detection step thereby to generate a reception-side shift matrix; and a demodulation step of demodulating elements of each column of the reception-side shift matrix by a predetermined modulation scheme.

* * * * *